(12) United States Patent
Ito et al.

(10) Patent No.: US 10,393,064 B2
(45) Date of Patent: Aug. 27, 2019

(54) SEAL STRUCTURE FOR INTERNAL COMBUSTION ENGINE

(71) Applicant: MAHLE FILTER SYSTEMS JAPAN CORPORATION, Tokyo (JP)

(72) Inventors: Daizo Ito, Saitama (JP); Atsushi Nonaka, Kawagoe (JP); Seiji Tani, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 116 days.

(21) Appl. No.: 15/478,776

(22) Filed: Apr. 4, 2017

(65) Prior Publication Data

US 2017/0298864 A1    Oct. 19, 2017

(30) Foreign Application Priority Data

Apr. 14, 2016    (JP) .................. 2016-080759

(51) Int. Cl.
*F02F 11/00* (2006.01)
*F02F 1/24* (2006.01)
(Continued)

(52) U.S. Cl.
CPC .............. *F02F 11/002* (2013.01); *F02F 1/24* (2013.01); *F02F 7/0043* (2013.01);
(Continued)

(58) Field of Classification Search
CPC . F02F 11/002; F02F 1/24; F02F 7/0043; F16J 15/062; F16J 15/104; F16J 15/14
(Continued)

(56) References Cited

U.S. PATENT DOCUMENTS 4,192,520 A * 3/1980 Hasegawa ............... F02F 7/006
                                                     277/591
5,536,018 A * 7/1996 Szott ...................... F16J 15/104
                                                     277/313
(Continued)

FOREIGN PATENT DOCUMENTS

| EP | 1 701 069 A1 | 9/2006 |
| JP | 2007-002766 A | 1/2007 |
| JP | 2014-145422 A | 8/2014 |

OTHER PUBLICATIONS

European Search Report in corresponding application EP17166139.0 dated Sep. 7, 2017.

*Primary Examiner* — Nathan Cumar
(74) *Attorney, Agent, or Firm* — Foley & Lardner LLP

(57) ABSTRACT

A seal structure for an internal combustion engine comprising: a cover side seal member which extends on upper surface sides or lower surface sides of both of an engine main body section and a chain casing and pressed and held against a cover member; a casing side seal member arranged at left or right end section of one end surfaces of the engine main body section onto which the chain casing is attached and pressed and held against the chain casing; a receiving concavity formed to extend on a junction surface of the chain casing to the cover member; and an extremely thick connection block section formed integrally on one end section of the casing side seal member, fitted into and retained by the receiving concavity, and projected more toward the cover member side than a junction surface of the chain casing to the cover member in a free state.

6 Claims, 11 Drawing Sheets

(51) Int. Cl.
*F02F 7/00* (2006.01)
*F16J 15/14* (2006.01)
*F16J 15/10* (2006.01)
*F16J 15/06* (2006.01)

(52) U.S. Cl.
CPC ........... *F16J 15/062* (2013.01); *F16J 15/104* (2013.01); *F16J 15/14* (2013.01)

(58) Field of Classification Search
USPC .......................................................... 277/596
See application file for complete search history.

(56) References Cited

U.S. PATENT DOCUMENTS

| | | | |
|---|---|---|---|
| 2002/0112684 A1* | 8/2002 | Jones | F02F 7/006 123/90.38 |
| 2006/0202432 A1* | 9/2006 | Taguchi | F16J 15/062 277/592 |
| 2008/0036157 A1* | 2/2008 | Starr | F02F 11/00 277/591 |

* cited by examiner

SEAL STRUCTURE FOR INTERNAL COMBUSTION ENGINE

FIELD OF THE INVENTION

The present invention relates to a seal structure for an internal combustion engine including an engine main body section, a chain casing, and a cover member such as a head cover, an oil pan, or so forth:

More particularly, the present invention relates to the seal structure in a junction of three members of the engine main body section, the chain casing, and the cover member.

BACKGROUND OF THE INVENTION

For example, each of Patent Documents 1 and 2 proposes such a kind of the seal structure for the internal combustion engine.

In the seal structure described in Patent Document 1, attention has been paid to a specificity of the seal structure extending on three elements of the engine main body section, the chain casing, and the cover member and a gasket intervened between the engine main body section and the chain casing is formed integrally with a metallic spacer grasped between the engine main body section and the chain casing, at both end sections of the gasket in an elongate direction thereof at which the gasket is abutted against the cover member.

Fitting convex sections of the spacer are concavo-convex mated into cutout sections in V shaped groove shapes of the engine main body side and the chain casing side.

A summit section of the spacer which opposes against a head cover or an oil pan, both of which being cover members, provides a flat surface. Then, a seal surface pressure when the spacer is abutted against the gasket attached to the head cover or the oil pan is secured.

Since, in the seal structure of Patent Document 1, the gasket intervened between the engine main body section and the chain casing is formed in a chevron shape at each of both end sections in the elongate direction at which the gasket is abutted against the cover member and the summit section having an acute angle and in the chevron shape is abutted against the gasket attached to the head cover side or the oil pan side, an increase in the seal surface pressure is achieved.

Pre-Published Document

Patent Document

Patent Document 1: a Japanese Patent Application Laid-open Publication No. 2007-002766
Patent Document 2: a Japanese Patent Application Laid-open Publication No. 2014-145422

SUMMARY OF THE INVENTION

However, since the gasket intervened between the engine main body section and the chain casing provides a hybrid structure, for example, of a rubber material and a metallic material, an increase of cost cannot be avoided.

In addition, since, in the structure described in Patent Document 2, the gasket intervened between the engine main body section and the chain casing is formed of a single material such as rubber or so forth, the seal structure described in Patent Document 2 is advantageous in terms of cost but, since a receiving surface of the gasket is not provided against a fastening force of the head cover or the oil pan, both of which being the cover members, the gasket receives only a compression deformation in the elongate direction and an accompanied reaction force becomes insufficient. Thus, although the increase in the seal surface pressure is achieved, naturally there is a limit.

With such a task as described above in mind, it is an object of the present invention to provide a seal structure which can sufficiently secure the seal surface pressure between the head cover side or the oil pan side, each of the head cover and the oil pan being a cover member, even though the seal member intervened between the engine main body section and the chain casing is made of a single material such as a rubber based material or so forth.

According to one aspect of the present invention, there is provided a seal structure for an internal combustion engine at a junction of three members including: an engine main body section including a cylinder block and a cylinder head; a chain casing assembled onto one end surface of a periphery of the engine main body section via a seal member; and a cover member assembled via another seal member in a form extending on upper surface sides or lower surface sides of both of the engine main body section and the chain casing, the seal structure comprising: a cover side seal member arranged in a closed loop shape, which extends on upper surface sides or lower surface sides of both of the engine main body section and the chain casing, and pressed and held against the cover member; a casing side seal member arranged at left or right end section of one end surface of the engine main body section onto which the chain casing is attached, and pressed and held against the chain casing; a receiving concavity formed to extend on a junction surface of the chain casing to the engine main body section and another junction surface of the chain casing to the cover member and including a receiving surface parallel to the junction surface to the cover member; and an extremely thick connection block section formed integrally on one end section of the casing side seal member in an elongate direction of the casing side seal member, fitted into and retained by the receiving concavity, and projected more toward the cover member side than the junction surface of the chain casing to the cover member in a free state, an end surface of the extremely thick connection block section opposing against the cover member providing a flat abutting surface, and, in a state in which the three members of the engine main body section, the chain casing, and the cover member are joined and assembled together, the cover side seal member being contacted on the abutting surface of the connection block section under pressure to interconnect both of the seal members.

In addition, in a state in which three members of the engine main body section, the chain casing, and the cover member are joined together and assembled, the cover side seal member is brought in close contact under pressure on the abutting surface of the connection block section so that the seal members for both of the cover members are connected.

It should be noted that the above-described free state refers to a state in which a clamping (pressing) fastening force of the head cover or the oil pan, each of both of the head cover and the oil pan being a cover member, is not acted upon the chain casing.

Herein, it is desirable that mutually continuous seal beads are formed on portions of the general section of the casing side seal member and of the connection block section opposing against the engine main body section, in order to achieve an improvement in a further sealing characteristic, with the seal surface pressure by the casing side seal member increased.

Furthermore, regardless of a presence or an absence of the seal beads, a groove section which functions as a reservoir section of a liquid gasket so as to be exposed to the flat abutting surface may be formed on the connection block section.

Effect of the Invention

According to the present invention, since an extremely thick connection block section of the casing side seal member is received by a receiving surface of a receiving concavity formed on the chain casing and the cover side seal member is brought in contact with the flat abutting surface of the connection block section under pressure so that the seal surface pressure of the seal members can sufficiently be high so that an improvement in the sealing performance can be achieved and the casing side seal member is formed of a single flexible material such as rubber or so forth and this is advantageous in terms of cost.

In addition, since a seal bead is formed on a portion of the casing side seal member which is opposed against the engine main body section, the seal surface pressure of the casing side seal member can further be increased. Furthermore, in the connection block section, the space is formed which functions as the reservoir section of the liquid gasket by effectively utilizing the seal beads.

In a case where the liquid gasket is used in combination, a continuity of both seal lines can easily be secured in the connection section due to the pressure contact with both seal members.

Furthermore, in a case where the seal beads are formed not only on the casing seal member but also on the cover side seal member, the clearance between two seal beads of the cover side seal member is set to fall within the clearance between the two seal beads of the connection side block section. At this time, the seal surface pressure of both seal members can further be increased in the connection section due to the contact under pressure on the two seal members and the continuity of both of seal lines can further become favorable.

DETAILED DESCRIPTION OF THE INVENTION

Figure 1:
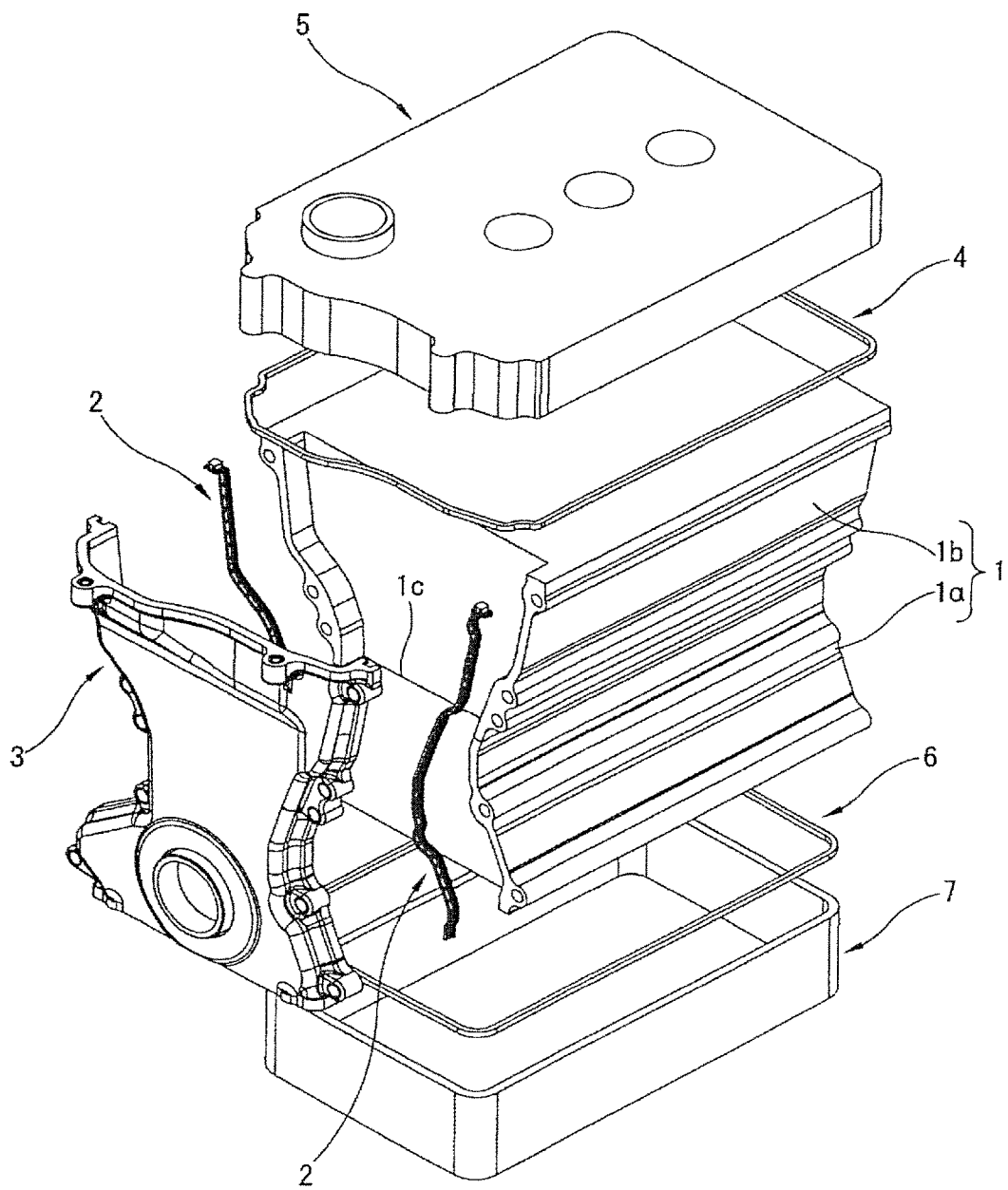
FIG. 1 is an exploded perspective view of a rough structure of an internal combustion engine diagrammatically representing a first preferred embodiment of a seal structure according to the present invention.
Figure 2:
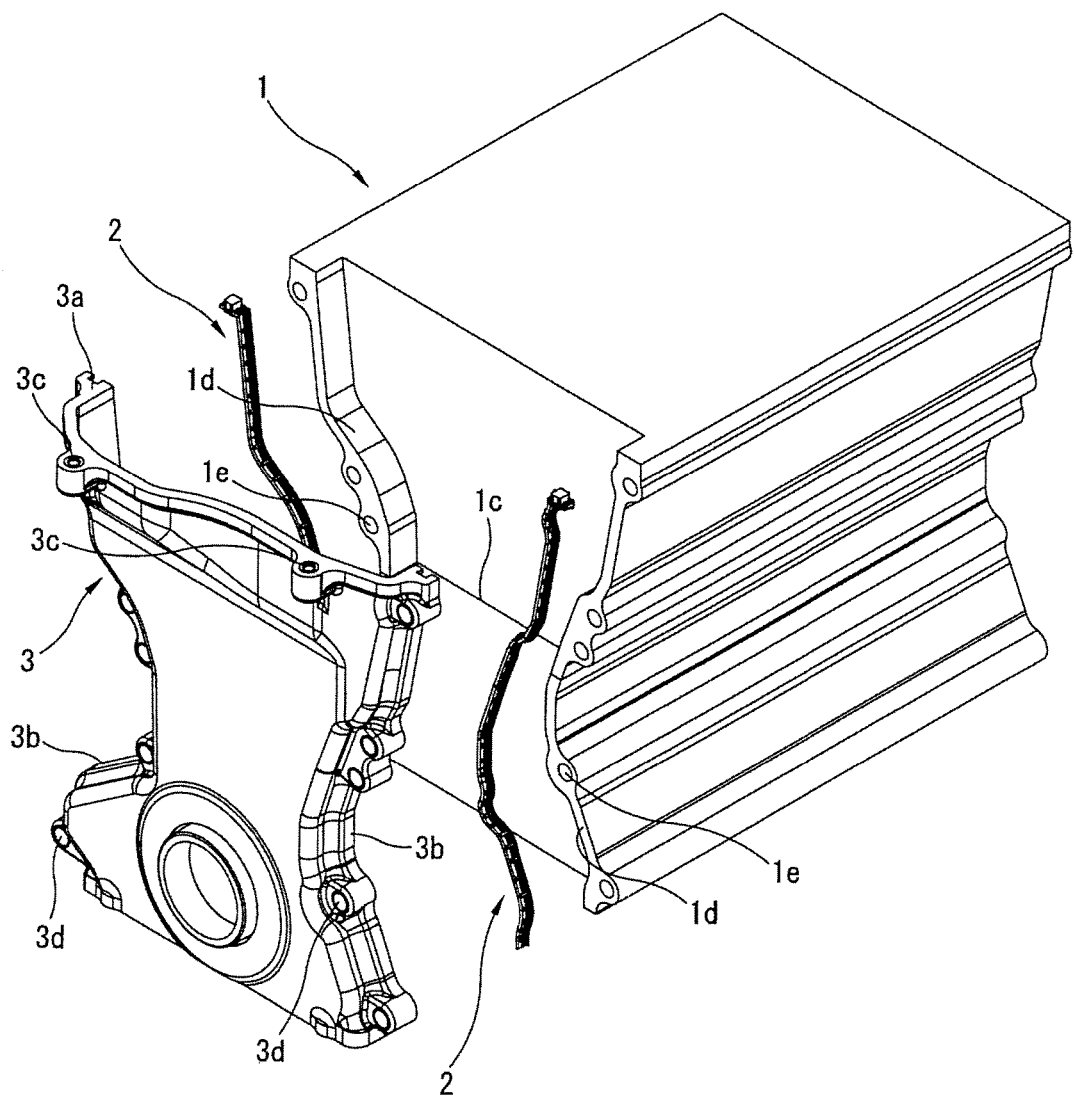
FIG. 2 is an expanded view of an essential part of FIG. 1.

FIGS. 1 through 7 show more specific forms to carry out a seal structure for an internal combustion engine according to the present invention. Particularly, FIGS. 1 and 2 show exploded perspective views, each of FIGS. 1 and 2 diagrammatically representing a rough structure of the internal combustion engine.

As shown in FIG. 1, a cylinder block 1*a* and a cylinder head 1*b* are joined at a junction 1*c* via a metal gasket (not shown) to constitute an engine main body section 1. A chain casing 3 (also called, a front cover) is joined onto one end surface of a periphery of this engine main body section 1 which provides a front side via a casing side gaskets 2, as left-side and right-side pair of casing side seal members to cover a timing chain (not shown) additively attached to engine main body section 1 to perform a rotational transmission.

A head cover 5 which is a cover member is joined onto upper surface sides of engine main body section 1 and chain casing 3 via cover side gaskets 2 which are left and right pair casing side seal members. Similarly, an oil pan 7 which is another cover member in a closed loop is joined onto lower surface sides of engine main body section 1 and chain casing 2 via a cover side gasket 6 in the closed loop shape as a cover side seal member.

When four members of engine main body section 1, chain casing 3, head cover 5, and oil pan 7 are correctly joined and the bolting is carried out to assemble these members, upper end sections of pair of casing side gaskets 2 are abutted against cover side gasket 4 in the closed loop shape intervened between engine main body section 1 and head cover 5 and are mutually connected together.

Similarly, lower end sections of casing side gaskets 2 are abutted against cover side gasket 6 in the closed loop shape and are mutually connected together.

It should be noted that resin made chain casing 3 and head cover 5 are adopted but metal such as light metal chain casing and head cover may be adopted.

It should also be noted that, as respective gaskets 2, 4, and 6, for example, rubber based material gaskets which are superior in heat resistance characteristics and oil resistance characteristics may be used and liquid gaskets may be used in combinations according to necessities. Furthermore, in FIG. 1, an internal structure of engine main body section 1, a power transmission system, an auxiliary equipment, and so forth are omitted from FIG. 1.

FIG. 2 is an expanded view of expanding a relationship among engine main body section 1, chain casing 3, and casing side gaskets 2 in FIG. 1.

Figure 3:
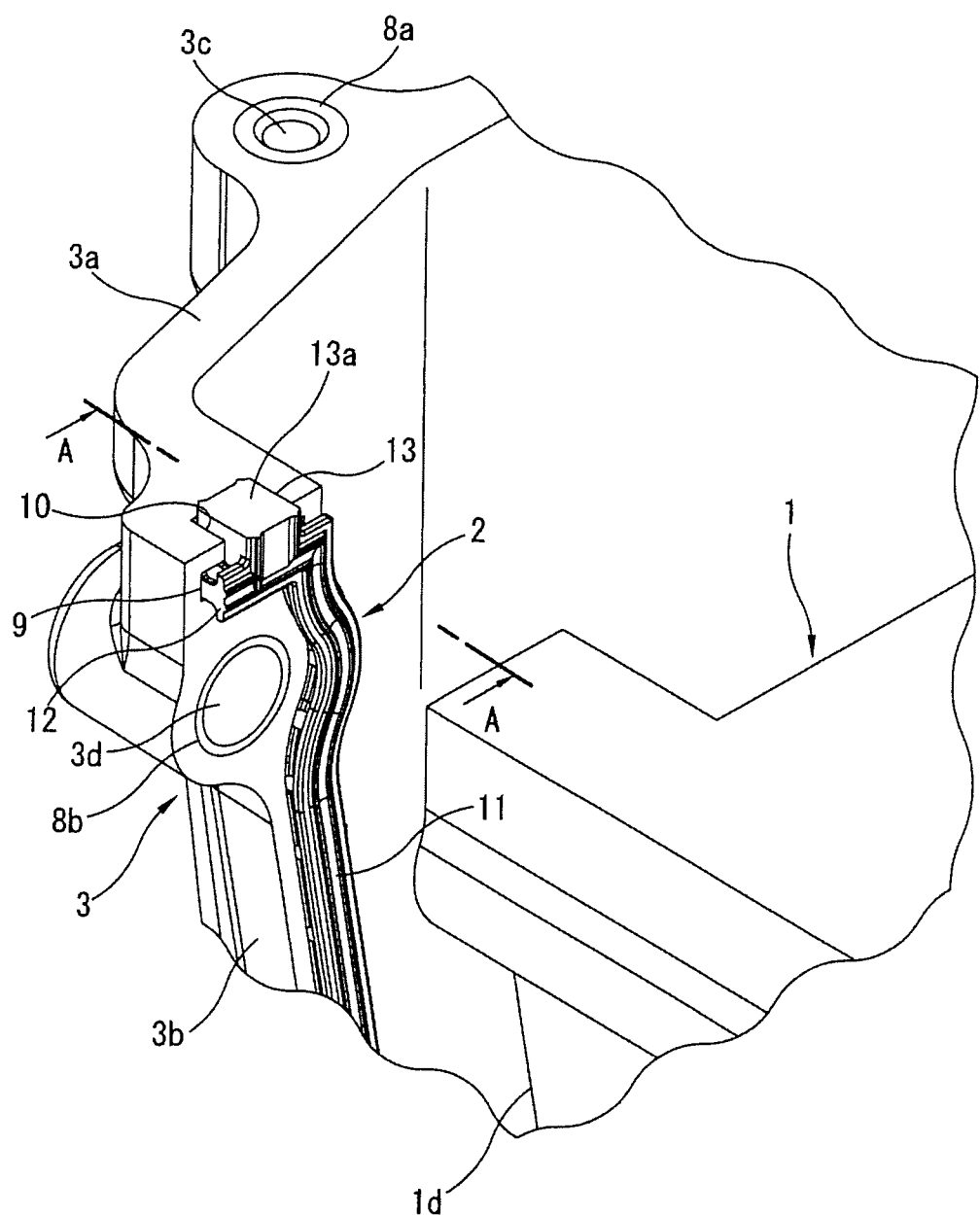
FIG. 3 is an expanded perspective view of the essential part of FIG. 1 viewed from another direction.
Figure 4:
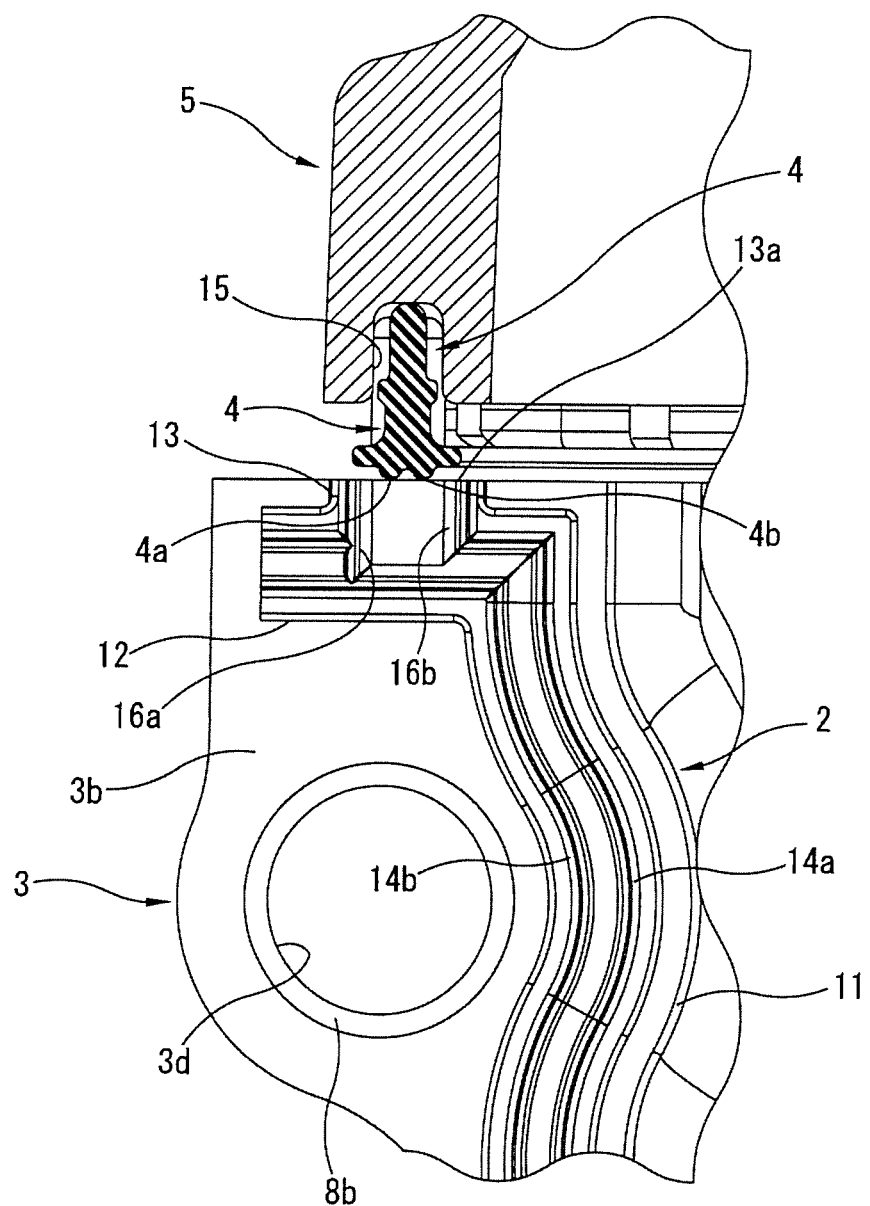
FIG. 4 is an explanatory cross sectional view cut away along a line B-B shown in FIG. 5.
Figure 5:
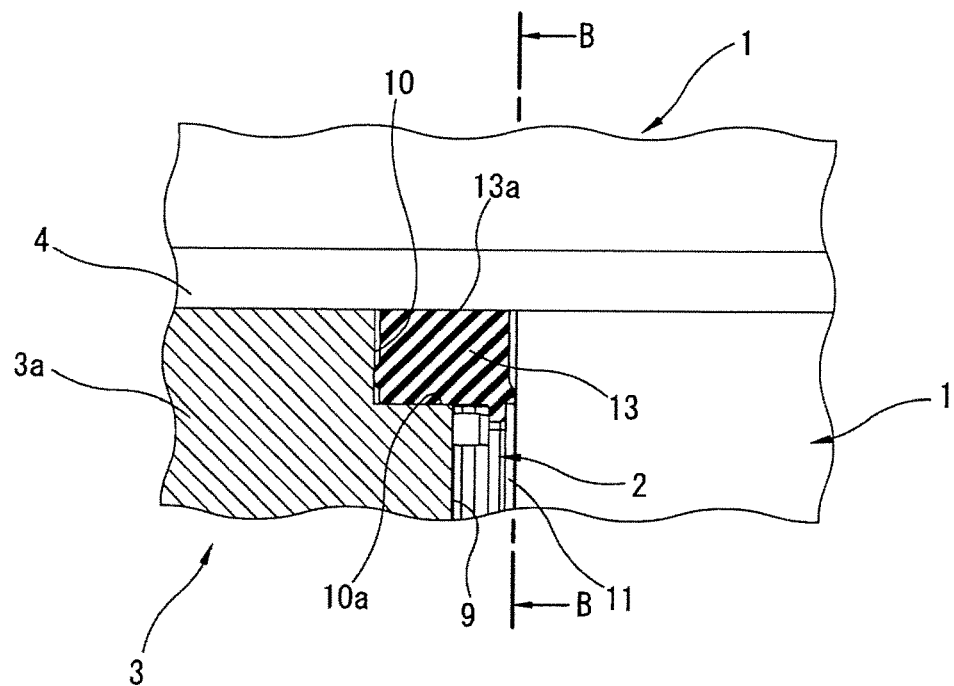
FIG. 5 is an explanatory cross sectional view cut away along a line A-A shown in FIG. 3.

In addition, FIG. 3 is an expanded view for viewing the essential part of FIG. 2 from another direction. FIG. 4 is a cross sectional view of the essential part in a junction state between chain casing 3 and head cover 5 shown in FIG. 3 and shows an expanded view corresponding to a cross section cut away along line B-B in FIG. 5. Furthermore, FIG. 5 shows a cross sectional view cut away along a line A-A in FIG. 3.

As shown in FIGS. 2 through 4, flange sections 1d are formed which project toward chain casing side 3 at left and right sides of engine main body section 1. End surfaces of flange sections 1d opposed against chain casing 3 provide junction surfaces abutted against chain casing 3. In addition, a plurality of screw holes 1e to perform the bolting are formed in respective flange sections 1d as described before.

On the other hand, upper side flange sections 3a and side flange sections 3b are formed on a peripheral edge section of chain casing 3. Upper surfaces of upper side surface flange sections 3a function as junction surfaces to be abutted against head cover 5 and end surfaces of side flange sections 3a function as other junction surfaces to be abutted against engine main body section 1, respectively.

A plurality of bolt holes 3c into which insert nuts 8a to perform the bolting with head cover 5 are buried are formed in upper side flange sections 3a of chain casing 3 and a plurality of bolt holes 3d into which collars 8b are buried to perform the bolting with engine main body section 1 are formed in side flange sections 3b.

Thus, engine main body section 1 and chain casing 3 are fastened with bolts (not shown) and head cover 5 is fastened with bolts (not shown) to these engine main body section 1 and chain casing 3 from the upper surface side of the engine main body section.

It should be noted that an inwardly oriented flange section formed to face toward engine main body section side 1 at a lower part of chain casing 3 (although not shown) and a lower surface of this flange section provides a junction surface abutted against oil pan 7. Oil pan 7 is fastened to bolted engine main body section 1 and chain casing 3 from its lower surface side by means of bolts (not shown).

A retaining groove 9 for each casing side gasket 2 along a vertical direction is formed, as shown in FIGS. 3 and 5, on the junction surface of each side flange section 3b of chain casing 3 opposing against engine main body section 1. Retaining groove 9 is bent in a substantially letter L shape at the upper end section thereof, as shown in FIG. 3. Each casing side gaskets 2 is fitted into retaining groove 9 and is retained thereby.

In addition, as shown in FIGS. 3 and 5, both of a groove width and a groove depth of a portion of retaining groove 9 are partially expanded at the upper end section of retaining groove 9.

A receiving concavity 10 in a substantially square hole shape is formed in which the junction surface against engine main body section 1 and the junction surface against head cover 5 are respectively opened.

A bottom surface of this receiving concavity 10 provides a receiving surface 10a which is parallel and flat to the junction surface to head cover 5.

Figure 6:
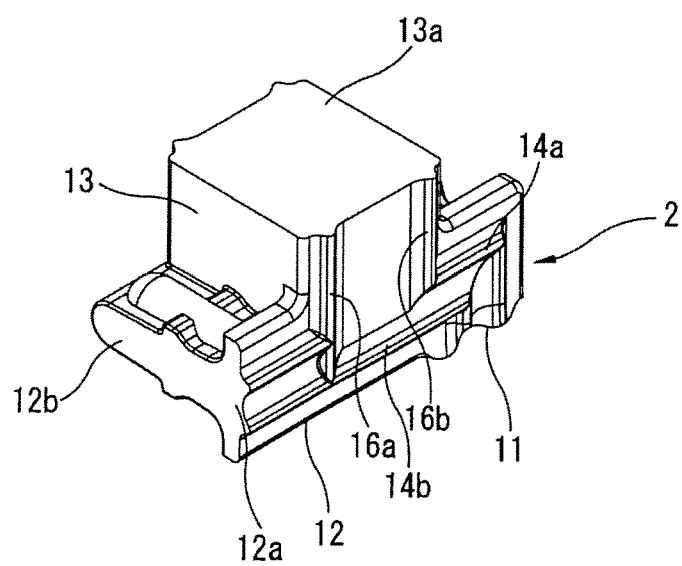
FIG. 6 is an expanded perspective view of an essential part of a casing side gasket shown in FIGS. 3 and 4.

On the other hand, each casing side gasket 2 fitted into and retained by retaining groove 9 is, as a whole, long and in a form of strings, as shown in FIG. 3 and FIG. 6 which is the expanded view of the essential part of FIG. 3.

At an upper end section of each casing side gasket 2, a terminal section 12 of each casing gasket 2 is bent from a general section 11 thereof through a substantially right angle in a substantially letter L shape.

Both of general section 11 and terminal section 12 have cross sections to form deformation letter T shapes with head sections 12a and leg sections 12b.

An extremely thick connection block section 13 in a square column shape which is thick as compared with terminal section 12, is integrally formed on a portion of terminal section 12 which corresponds to receiving concavity 10 shown in FIG. 5.

This connection block section 13 is fitted into and retained by receiving concavity 10.

Two wisps of seal beads 144a, 14b are formed to be mutually continued with each other between terminal section 12 and general section 11 of each casing gasket 2 on portions of seal surfaces of terminal section 12 and general section 11 including extremely thick connection block section 13 opposing against engine main body section 1, as shown in FIG. 4. It should be noted that similar two wisps of seal beads 16a, 16b are formed in a form branched from the two wisps of seal beads 14a, 14b on connection block section 13.

Furthermore, both of lower surface and upper surface of connection block section 13 provide mutually parallel and flat surfaces. The lower surface of connection block section 13 functions as a seating surface on receiving surface 10a of receiving concavity 10 side, as shown in FIG. 5. On the other hand, the upper surface of connection block section 13 functions as a flat abutting surface 13a to abut against cover side gasket 4.

Figure 7:
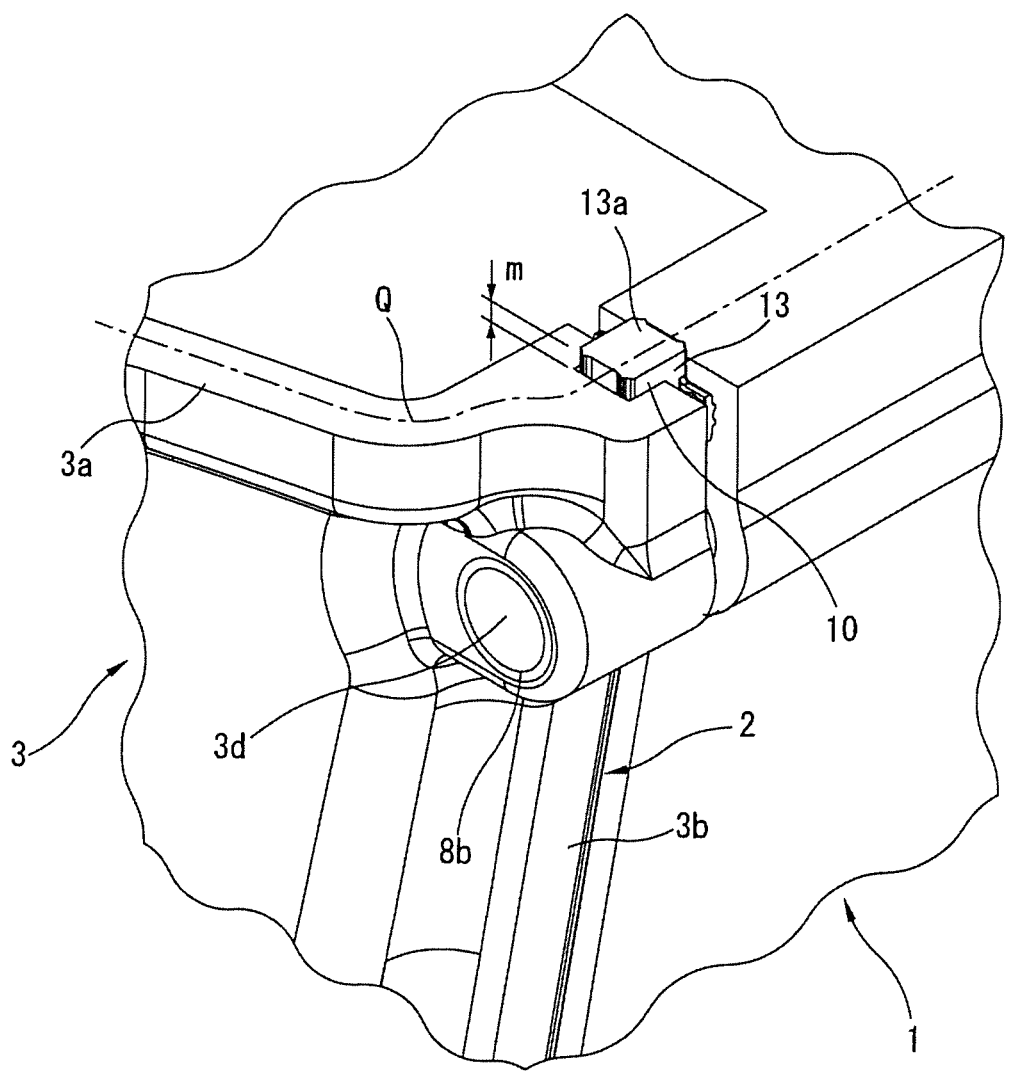
FIG. 7 is a perspective view of an essential part representing a junction state between an engine main body section and a chain casing shown in FIG. 3.

Then, FIG. 7 shows a state in which engine main body section 1 and chain casing 3 are joined together via casing side gaskets 2. As shown in FIG. 3 and FIG. 7, in a state in which chain casing 3 is joined to engine main body section 1 via casing side bracket 2 and head cover 5 is not joined to engine main body section 1 and chain casing 3, a tip section of connection block section 13 is projected by a preset projection height m (for example, about several millimeters) from a junction surface of chain casing 3 side which is flush with an upper surface of engine main body section 1.

FIG. 4 shows a state in which head cover 5 is joined to chain casing 3 and assembled thereto. As shown in FIG. 4, another retaining groove 15 in the closed loop shape is formed on a portion of an opening edge section of head cover 5 which provides the junction surface of engine main body section 1 and chain casing 3, cover side gasket 4 being fitted into and retained by other retaining groove 15. This cover side gasket 4 has the cross section shape in the deformation letter T shape in the same way as general sections 11 of casing side gaskets 2. This cover side gasket 4 is, as a whole, formed in the closed loop shape so as to enclose an opening peripheral edge section of head cover 5 and two wisps of seal beads 4a, 4b are formed on a seal surface of head cover 5 against engine main body section 1 and chain casing 3.

Then, as appreciated from FIG. 4, when head cover 5 is joined to engine main body section 1 and chain casing 3 via cover side gaskets 2 and assembled by means of bolting, at the junction between engine main body section 1 and chain casing 3, cover side gasket 4 crosses and runs onto flat abutting surface 13a of connection block section 13 of each casing side gasket 2 is compression deformed in a height direction and respective gaskets 2, 4 and, thus, seal lines of both gaskets 2, 4 are connected to each other. It should be noted that, in FIG. 7, the seal lines of cover side gasket 4 against engine main body section 1 and chain casing 3 are denoted in a dot-and-dash line Q for convenience purposes.

On that basis, a clearance between two wisps of seal beads 4a, 4b formed on cover side gasket 4 is preset to a magnitude such as to fall within another clearance between the two wisps of seal beads 16a, 16b formed on the seal surface of connection block section 13 of each casing side gasket 2.

It should be noted that, although detailed drawing indications are omitted, the substantially same seal structures as head cover 5 side are taken in the junction of oil pan 7 to engine main body section 1 and chain casing 3.

Hence, according to the first embodiment, extremely thick connection block section 13 of each casing side gasket 2 is received by bottom surface 10a of receiving concavity 10 which functions as a receiving surface of receiving concavity 10 at chain casing 3 side shown in FIG. 5 and, while connection block section 13 projected toward head cover 5 side is compression deformed, seal beads 4a, 4b of cover side gasket 4 are brought in contact with the two wisps of seal beads 4a, 4b of cover side gasket 4 under pressure so that both gaskets 2, 5 are mutually connected together.

Therefore, even if, for example, in a state in which chain casing 3 is assembled to engine main body section 1, a minute step difference between the junction surface of engine main body section 1 side to head cover 5 and the junction surface of chain casing 3 side to the head cover 5 is developed, cover side gasket 4 and connection block section 13 of each casing side gasket 2 and casing side gasket 2 can faithfully follow the step difference and a seal surface pressure of mutual gaskets 2, 4 can sufficiently make high so that an improvement in a seal performance can be achieved. In addition, since casing side gasket 2 can be formed with a single flexible material such as rubber or so forth, the seal structure in the first embodiment can be advantageous in terms of cost.

Such a step difference as described above is easily generated due to an aging warp or deformation during a molding of chain casing 3 itself in a case where a resin made chain casing 3 is adopted. Hence, the seal structure in the first embodiment is especially effective in a case where resin made chain casing 3 is adopted.

In addition, since seal beads 14a, 14b, 16a, 16b, and 4a, 4b are formed on their respective seal surfaces of casing side gaskets 2 and cover side gasket 4, an improvement effect of a seal performance based on the fact that seal surface pressure of individual gaskets 2, 4 can be made high becomes further remarkable. In addition, as explained on a basis of FIG. 4, since the clearance between the two wisps of seal beads 4a, 4b of cover side gasket 4 is set to fall within the clearance between the two wisps of seal beads 16a, 16b of connection block section 13 side, in a case where the liquid gasket is used in combination in the proximity of connection block section 13, the space between the two wisps of seal beads 16a, 16b at connection block section 13 side can function as the reservoir section of the liquid gasket. Therefore, especially in a connection section between cover side gasket 4 and connection block section 13 of each casing side gasket 2, a security of a continuity of seal lines of both gaskets 2, 4 can more assuredly be carried out.

FIGS. 8 through 12 show second through sixth preferred embodiments according to the present invention and show modifications of connection block section 13 in each casing side gasket 2 shown in FIG. 6. It should be noted that portions common to the first embodiment designate the same reference numerals.

Figure 8:
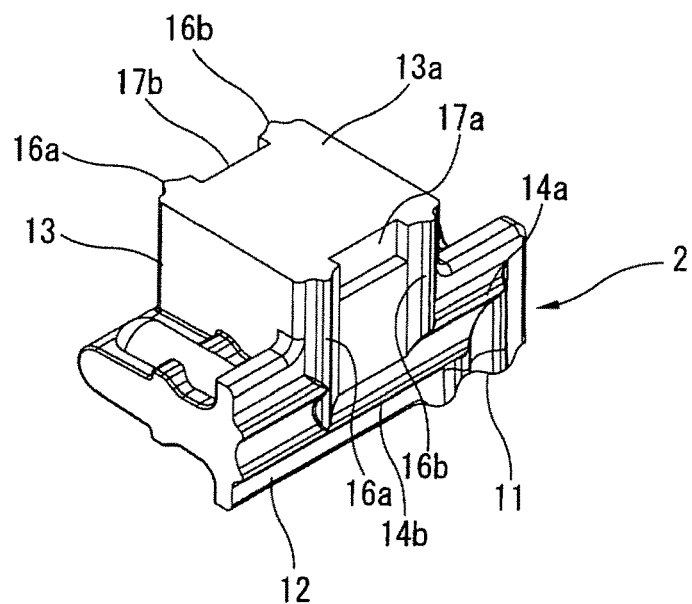
FIG. 8 is an expanded perspective view of a casing side gasket representing a second preferred embodiment of the seal structure according to the present invention.

In a second embodiment shown in FIG. 8, FIG. 8 is common to FIG. 6 in that the two wisps of seal beads 16a, 16b are formed on the seal surface of connection block section 13 against engine main body section 1.

In addition, the seal surface of connection block section 13 one step digs down between the two wisps of seal beads 16a, 16b so that a groove section 17a which is exposed to flat abutting surface 13a is formed. In a case where a back surface side of connection block section 13 opposite to the seal surface of connection block section 13, another groove section 17b is similarly formed to be exposed to flat abutting surface 13a.

In a case where only two wisps of seal beads 16a, 16b are formed on connection block section 13, it is necessary to more or less crush these seal beads 16a, 16b in order to exhibit a natural seal function. Hence, as described before, when the space between both seal beads 16a, 16b functions as the reservoir section of the liquid gasket, there is a possibility that a sufficient capacity (a volume) as the reservoir section cannot be secured.

As a countermeasure thereof, as shown in FIG. 8, since groove sections 174a, 17b are formed positively on the seal surface of connection block section 13 and a back surface opposite to the seal surface of connection block section 13 so that the sufficient capacity as the reservoir section of the liquid gasket can be secured.

Figure 9:
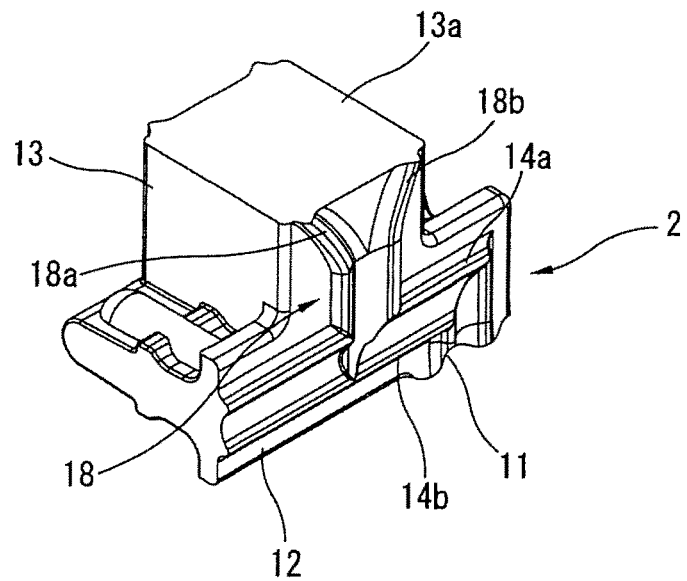
FIG. 9 is an expanded perspective view of an essential part of the casing side gasket representing a third preferred embodiment of the seal structure according to the present invention.

Since, in a third preferred embodiment shown in FIG. 9, a seal bead 18 is formed on the seal surface of connection block section 13 as a substantially letter Y shape seal bead, while a continuity of seal bead 18 with seal beads 14a, 14b is secured. Then, two seal bead fragments 18a, 18b are mutually spaced apart from each other only at portions of seal bead fragments 18a, 18b which are near to flat abutting surface 13a and a space between these two seal bead fragments 18a, 18b functions as the reservoir section of the liquid gasket Since, in this embodiment, a lower half side of seal bead 18 becomes extremely thick, seal bead 18 becomes difficult to be crushed and deformed during a pressure contact on another party side. Consequently, the space between two seal bead fragments 18a, 18b can positively function as the reservoir section of the liquid gasket.

Figure 10:
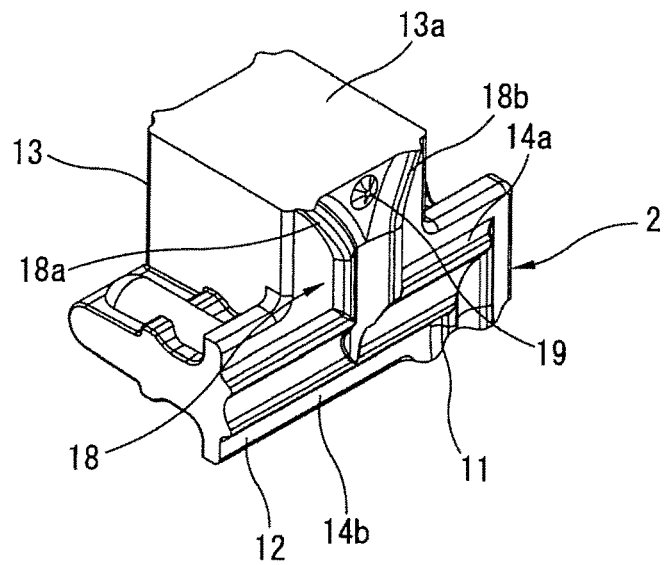
FIG. 10 is an expanded perspective view of the casing side gasket representing a fourth preferred embodiment of the seal structure according to the present invention.

In a fourth embodiment shown in FIG. 10, in the same way as the third embodiment shown in FIG. 9, seal bead 18 on the seal surface of connection block section 13 is formed in a substantially letter Y shape. Two wisps of seal bead fragments 18a, 18b are mutually spaced apart from each other and only at a portion of seal bead 18 which is near to flat abutting surface 13a the two wisps of seal beads 18a, 18b are mutually spaced apart and a single projection section 19 is formed between these wisps seal bead fragments 18a, 18b.

In the fourth embodiment, projection section 19 is provided so that the space between these two wisps of seal bead fragments 18a, 18b which functions as the reservoir section of the liquid gasket can more assuredly be secured.

Figure 11:
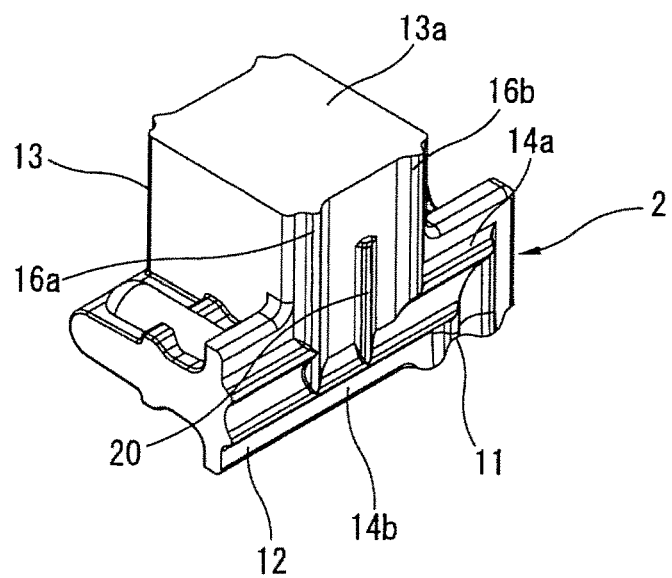
FIG. 11 is an expanded perspective view of the casing side gasket representing a fifth preferred embodiment of the seal structure according to the present invention.

In a fifth embodiment shown in FIG. 11, with the structure shown in FIG. 6 as a basis, a third seal bead 20 is added to connection block section 13 between these two wisps of seal beads 16a, 16b and only on the lower half side of these seal beads 16a, 16b.

In the fifth embodiment, since third seal bead 20 is provided in addition to these two wisps of seal beads 16a, 16b, in the same way as the fourth embodiment shown in FIG. 10, the space which functions as the reservoir section of the liquid gasket can more assuredly be secured between these wisps of seal beads 16a, 16b.

Figure 12:
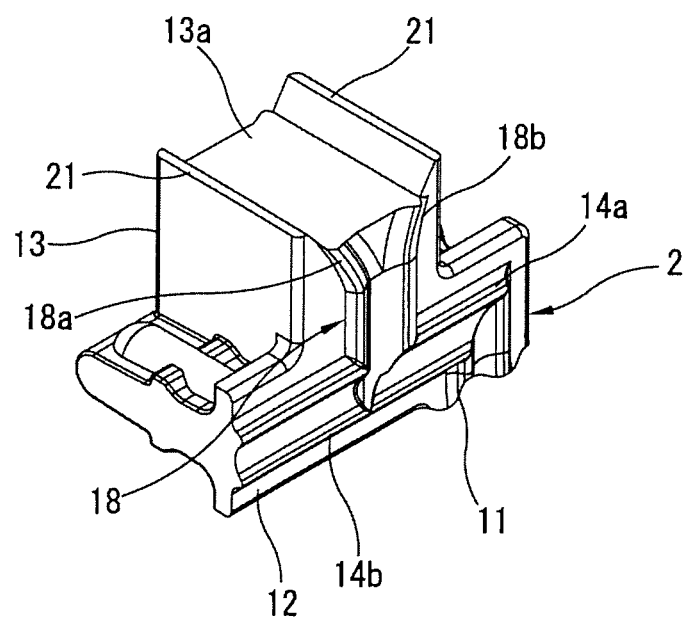
FIG. 12 is an expanded perspective view of the casing side gasket representing a sixth preferred embodiment of the seal structure according to the present invention.

In a sixth preferred embodiment shown in FIG. 12, with the structure shown in FIG. 9 as a basis, only both side sections of flat abutting surface 13a are left as longitudinal ribs 21 and flat abutting surface 13a except these ribs 21 is relatively lowered so that an upper space over flat abutting surface 13a substantially functions as the reservoir section of the liquid gasket.

Since, in the sixth embodiment, a holding capacity of the liquid gasket becomes large but the seal surface pressure between cover side gasket 4 and connection block section 13 becomes low, a combination use of the liquid gasket in the proximity of at least connection block section 13 becomes essential.

The continuity of the seal lines between cover side gasket 4 and connection block section 13 becomes largely dependent on the presence of the liquid gasket.

Figure 13:
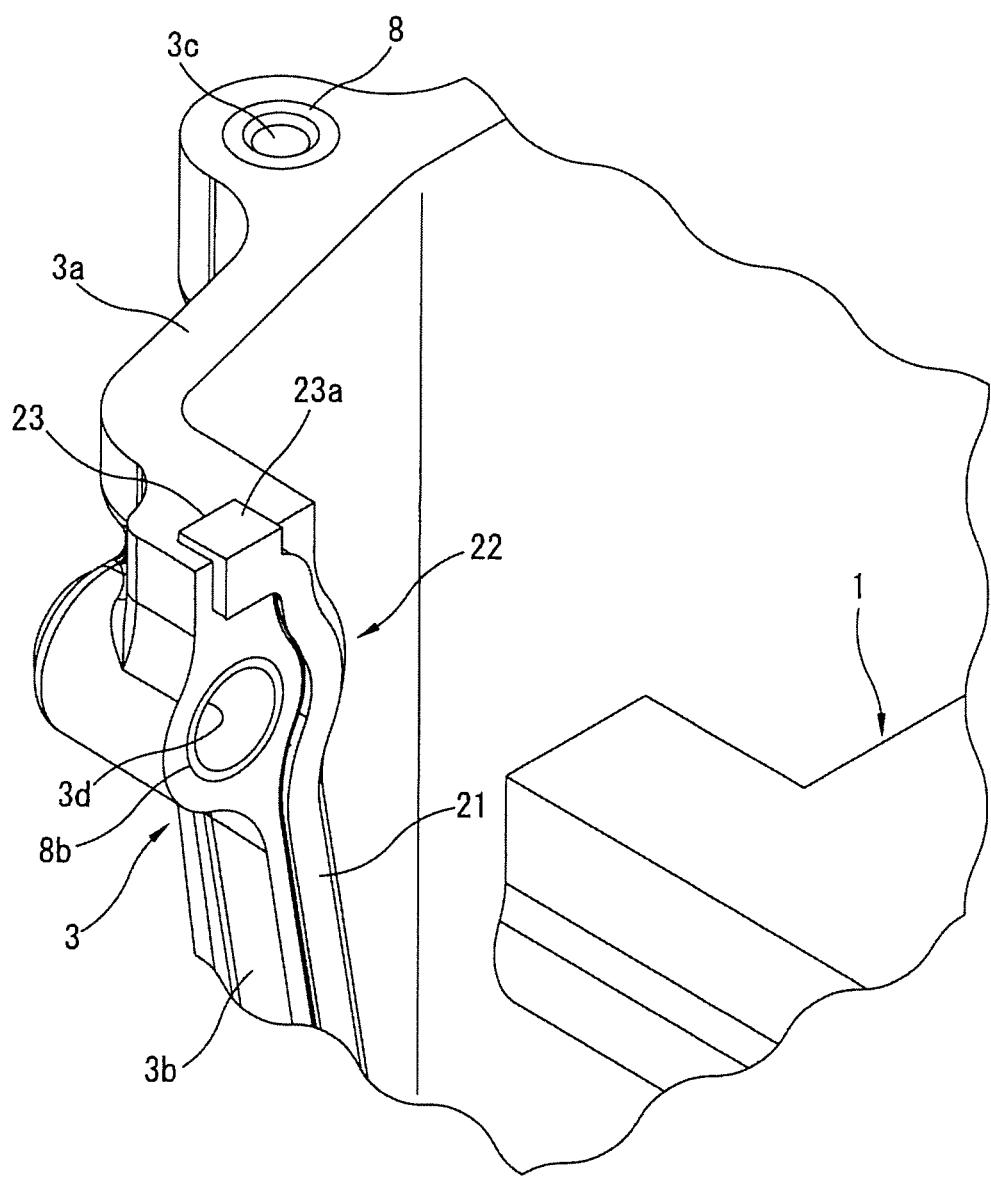
FIG. 13 is a perspective view of a position equal to FIG. 3 representing a seventh preferred embodiment of the seal structure according to the present invention.
Figure 14:
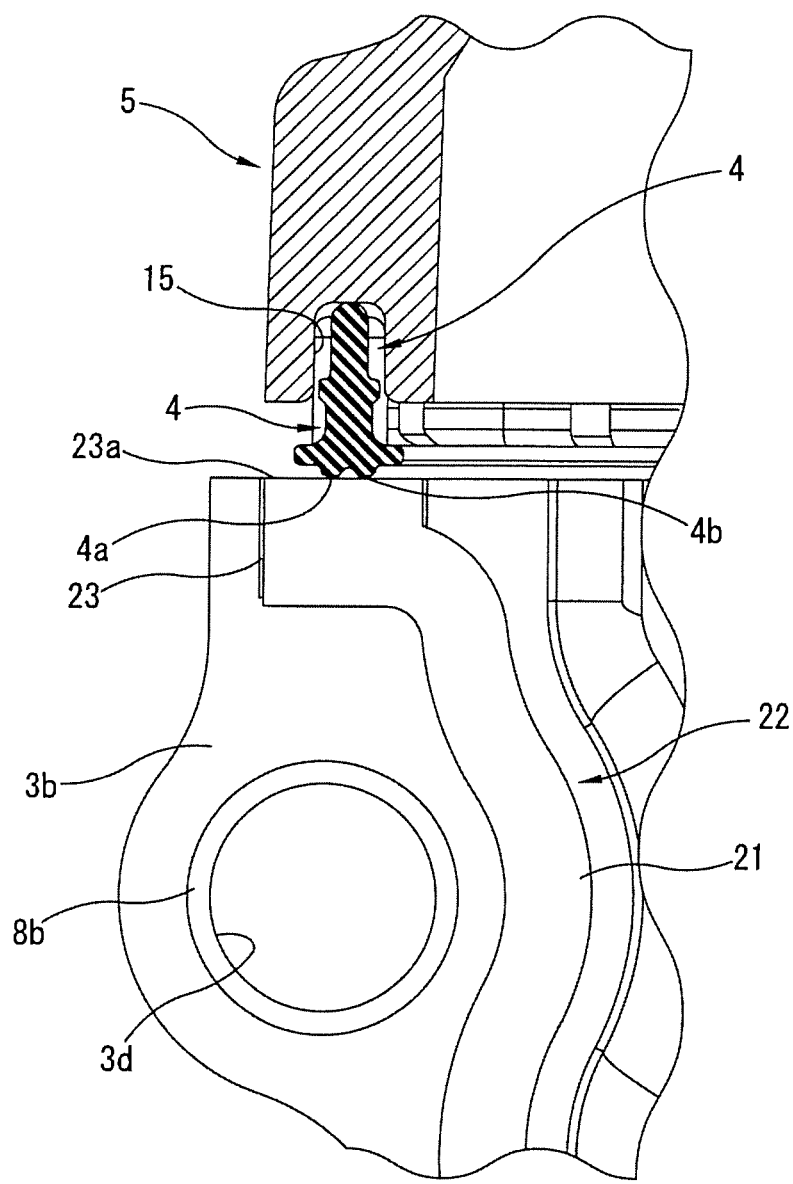
FIG. 14 is a cross sectional explanatory view representing a state equivalent to that of FIG. 4 in the structure shown in FIG. 13.

FIGS. 13 and 14 show a seventh preferred embodiment according to the present invention. FIG. 13 shows an essential part expanded view in the same state as FIG. 3 and FIG. 14 shows an essential part expanded view in the same state as FIG. 4, respectively. It should be noted that the same reference numerals as parts common to the first embodiment are designated.

As appreciated from FIGS. 13 and 14, in this embodiment, extremely thick connection block 23 is integrally and directly connected and formed on an upper end section of general section 21 of casing side gasket 22 and the upper end surface of connection block section 23 provides flat abutting surface 23a against cover side gasket 4. In addition, the seal beads as shown in FIG. 3 are not formed on the seal surfaces of connection block section 23 and general section 21 and the seal surface against engine main body section 1 becomes a simple flat surface. In these points, the sixth embodiment is different from the above-described first embodiment.

Since, in this embodiment, this embodiment is the same as the first embodiment excepting a presence or absence of the seal beads described above, the same effects as the first embodiment can be obtained excepting a secondary effect due to the seal beads.

EXPLANATION OF REFERENCE NUMERALS

1 . . . engine main body section
1a . . . cylinder block
1b . . . cylinder head
2 . . . casing side gasket (casing side seal member)
3 . . . chain casing
4 . . . cover side gasket (cover side seal member)
4a, 4b seal beads
5 head cover (cover member)
6 . . . cover side gasket (cover side seal member)
7 . . . oil pan (cover member)
9 . . . retaining groove
10 . . . receiving concavity
10a . . . receiving surface
11 . . . general section
13 . . . connection block section
13a . . . abutting surface
14a, 14b . . . seal beads
15 retaining groove
16a, 16b . . . seal beads
174a, 17b . . . groove sections
18 . . . seal bead
22 . . . casing side gasket (casing side seal member)
23 connection block section
23a . . . abutting surface

What is claimed is:

1. A seal structure for an internal combustion engine at a junction of three members including an engine main body section including a cylinder block and a cylinder head; a chain casing assembled onto one end surface of a periphery of the engine main body section via a seal member; and at least one cover member assembled via another seal member so as to extend on upper surface sides or lower surface sides of both of the engine main body section and the chain casing, the seal structure comprising:

a cover side seal member arranged in a closed loop shape, which extends on upper surface sides or lower surface sides of both of the engine main body section and the chain casing, and which is pressed and held against the at least one cover member;

a casing side seal member arranged at a left or right end section of one end surface of the engine main body section onto which the chain casing is attached, and which is pressed and held against the chain casing;

a receiving concavity formed to extend on a surface where the chain casing meets the engine main body section and another surface where the chain casing meets the at least one cover member, the receiving concavity including a receiving surface parallel to the another surface where the chain casing meets the at least one cover member; and a connection block section formed integrally on one end section of the casing side seal member in an elongate direction of the casing side seal member, and fitted into and retained by the receiving concavity, and which is projected more toward a side of the at least one cover member than the another surface where the chain casing meets the at least one cover member in a free state, an end surface of the connection block section opposing against the at least one cover member so as to provide a flat abutting surface, and, in a state in which the three members of the engine main body section, the chain casing, and the at least one cover member are joined and assembled together, the cover side seal member is contacted on the abutting surface of the connection block section under pressure to interconnect both of the cover side and casing side seal members.

2. The seal structure for the internal combustion engine as claimed in claim 1, wherein:

a part of the casing side seal member except the connection block section is fitted into and held in a retaining groove formed on the surface where the chain casing meets the engine main body section to be continuous with the receiving concavity, mutually continuous seal beads are formed on portions of the part of the casing side seal member and the connection block section of the casing side seal member opposing against the engine main body section, and among a portion of the seal beads formed on the connection block section which is proximate to at least the flat abutting surface, two seal beads are mutually spaced apart from each other, and a space between the two seal beads is configured as a reservoir of a liquid gasket.

3. The seal structure for the internal combustion engine as claimed in claim 2, wherein:

the cover side seal member is fitted into and retained by a gasket groove formed on a surface where the at least one cover member meets the engine main body section and the surface where the chain casing meets the at least one cover member, seal beads are formed on portions of the cover side seal member opposing against the engine main body section and the chain casing, two seal beads are mutually spaced apart from each other at least among a portion of the seal beads formed on the cover side seal member corresponding to the abutting surface of the connection block section, and a clearance between the two seal beads is set to fall within the space between the two seal beads formed on the connection block section.

4. The seal structure for the internal combustion engine as claimed in claim 1, wherein a groove section that makes up a reservoir of a liquid gasket is formed on the connection block section to be exposed to the flat abutting surface.

5. The seal structure for the internal combustion engine as claimed in claim 1, wherein the connection block section is thicker than the one end section of the casing side seal member.

6. A seal structure configured to be disposed at a junction of three structures, the three structures comprising an engine main body including a cylinder block and a cylinder head, a chain casing assembled onto one end surface of a periphery of the engine main body via a seal, and at least one cover assembled via another seal so as to extend on first surface sides or second surface sides of both of the engine main body and the chain casing, the seal structure comprising:

a cover side seal arranged as a closed loop, which extends on first surface sides or second surface sides of both of the engine main body and the chain casing, and which is pressed and held against the at least one cover;

a casing side seal arranged at a left or right end of one end surface of the engine main body onto which the chain casing is attached, and which is pressed and held against the chain casing;

a receiving concavity formed to extend on a surface where the chain casing meets the engine main body and another surface where the chain casing meets the at least one cover, the receiving concavity including a receiving surface parallel to the another surface where the chain casing meets the at least one cover; and a connection block formed integrally on one end of the casing side seal in an elongate direction of the casing side seal, and fitted into and retained by the receiving concavity, and which is projected more toward a side of the at least one cover than the another surface where the chain casing meets the at least one cover in a free state, an end surface of the connection block opposing against the at least one cover so as to provide a flat abutting surface, and, in a state in which the engine main body, the chain casing, and the at least one cover are joined and assembled together, the cover side seal is contacted on the abutting surface of the connection block under pressure to interconnect both of the cover side and casing side seals.

* * * * *